(12) United States Patent
Sutton, Jr.

(10) Patent No.: US 10,814,887 B1
(45) Date of Patent: Oct. 27, 2020

(54) OPEN-CABIN RIDING MOWER

(71) Applicant: KUBOTA CORPORATION, Osaka (JP)

(72) Inventor: Phillip Sutton, Jr., Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/422,409

(22) Filed: May 24, 2019

(51) Int. Cl.
| A01D 34/78 | (2006.01) |
| B60W 50/16 | (2020.01) |
| B60K 31/00 | (2006.01) |
| A01D 101/00 | (2006.01) |

(52) U.S. Cl.
CPC ......... B60W 50/16 (2013.01); B60K 31/0008 (2013.01); *A01D 2101/00* (2013.01)

(58) Field of Classification Search
None
See application file for complete search history.

(56) References Cited

U.S. PATENT DOCUMENTS

| 8,065,054 | B2 | 11/2011 | Tarasinski et al. | |
| 2008/0174415 | A1* | 7/2008 | Tanida | B60Q 9/00 |
| | | | | 340/438 |
| 2016/0358453 | A1* | 12/2016 | Wassef | G08B 25/016 |
| 2018/0037183 | A1* | 2/2018 | Bartel | B60R 22/48 |
| 2019/0075724 | A1* | 3/2019 | Becke | A01D 34/78 |
| 2019/0292751 | A1* | 9/2019 | Kassen | A01B 71/02 |
| 2019/0339688 | A1* | 11/2019 | Cella | G06N 7/005 |

FOREIGN PATENT DOCUMENTS

JP  2013-87656  5/2013

* cited by examiner

*Primary Examiner* — Brent Swarthout
(74) *Attorney, Agent, or Firm* — Greenblum & Bernstein P.L.C.

(57) ABSTRACT

An open-cabin riding mower includes a haptic feedback device incorporated in at least one of a driver's seat, a footrest and a maneuvering operational tool which are contact with the driver's body in the course of traveling and configured to provide a physical stimulus to the driver, a condition evaluation unit for evaluating a condition related to traveling of the mower and a device control section for controlling an operational pattern of the haptic feedback device based on result of the evaluation by the condition evaluation unit.

11 Claims, 5 Drawing Sheets

OPEN-CABIN RIDING MOWER

TECHNICAL FIELD

This invention relates to an open-cabin riding mower maneuverable via an operation of a maneuvering tool by a driver seated at a driver's seat.

BACKGROUND ART

In the case of an open-cabin mower, its driver is directly exposed to noise from a power source such as an engine or a motor and grass mowing noise. Therefore, it becomes difficult for the driver to hear an alarm sound or voice message which is issued during work traveling. Moreover, in a grass mowing work in a small area by the mower, the mower often effects forward and reverse runs and sharp turns in repetition. In the course of such traveling, the driver cannot keep stationary posture, so it becomes difficult for the driver to take notice of an alarming lamp indicator or to read an alarm message displayed on a meter or a display device.

Utilization of a haptic feedback in place of information communication means using auditory or visual sense in a work vehicle such as a tractor is disclosed in e.g. U.S. Pat. No. 8,065,054. With this tractor, with forcible activation of an actuator, the driver will be notified of the vehicle condition being inappropriate or dangerous. As the actuator for providing such haptic feedback, there are disclosed a suspension actuator for a suspension unit included in a vehicle body frame and a seat actuator for supporting a seat to the vehicle body frame with cushioning.

In the case of the haptic feedback according to the U.S. Pat. No. 8,065,054, vibration generated by the actuator is transmitted to the driver indirectly via at least one constituent member (a cabin or a seat) of the vehicle. With such haptic feedback via a constituent member of the vehicle, there is a problem of an alarming based on vibration being not effectively transmitted to the driver unless the vibration is enhanced.

Moreover, in the haptic feedback according to this document, no consideration is given to communication of different kinds of alarm to the driver discretely. In case vibration occurs in the constituent member per se as a haptic transmitting means used in the haptic feedback (external disturbance) due to a factor other than the vibration by the actuator, if the frequencies of these vibrations (including their harmonics) are similar to each other, there will occur another problem of the alarming based on the actuator-based vibration being difficult to be transmitted to the driver.

A work vehicle according to Japanese Unexamined Patent Application Publication No. 2013-87656 includes a fuel cut solenoid for opening/closing a stop valve provided at a mid portion of a passage for feeding fuel to a diesel engine, a control section for determining possibility/impossibility (allowability/non-allowability) of power feeding to the fuel cut solenoid, and a reporting section for reporting a decision of such determination to a worker. This reporting section is capable of stimulating perception of the worker via light, sound, vibration or any combination of these.

In the case of this Japanese Unexamined Patent Application Publication No. 2013-87656, the document describes only that the reporting section reports the determination result with using vibration, other than light or sound. The document is silent about how the reporting contents are to be communicated to the worker, namely, how the haptic feedback is to be configured.

SUMMARY OF THE INVENTION

In view of the above-described state of the art, an object of the present invention is to provide an open-cabin riding mower including a haptic feedback device operable under a plurality of modes.

An open-cabin riding mower according to the present invention comprises:

a driver's seat that contacts the body of a driver in the course of traveling;

a footrest for receiving a foot of the driver;

a maneuvering operational tool to be gripped by the driver in the course of traveling;

a haptic feedback device incorporated in at least one of the driver's seat, the footrest and the maneuvering operational tool and configured to provide a physical stimulus to the driver;

a condition evaluation unit for evaluating a condition related to traveling of the mower; and a device control section for controlling an operational pattern of the haptic feedback device based on result of the evaluation by the condition evaluation unit.

With the haptic feedback provided in this mower, the haptic feedback device for providing a physical stimulus such as vibration is incorporated in a constituent member (driver's seat, footrest, maneuvering operational tool) which is placed in direct contact with the driver's body. Thus, even under conditions exposed to various kinds of external disturbances, the driver can appropriately perceive the stimulus provided by the haptic feedback device. Moreover, since the device control section can control an operational pattern of the haptic feedback device, this haptic feedback device can be operated in a mode corresponding to the result of evaluation.

In the course of work traveling (traveling with working) of the mower, information to be reported to the driver will be determined based on the result of evaluation made by the condition evaluation unit. Subjects of such evaluation include e.g. a rear obstacle, a fuel remaining amount, a power source trouble (overheating, oil pressure drop, etc.), a mowing trouble (clogging of cut grass clippings, etc.), an external communication (e.g. emergency wireless communication), and so on. The information to be reported will have a different degree of emergency, depending on the kind of the evaluation subject. Further, even for a same kind of evaluation subject, its degree of emergency may differ, depending on the level of the evaluation result. For instance, in the case of an obstacle evaluation, the emergency degree will differ, depending on the distant to that obstacle. According to the present invention, the operational pattern of the haptic feedback device can be controlled, so that the operational pattern of the haptic feedback device can be changed in accordance with the degree of emergency. And, with such change of the operational pattern, a corresponding change will be made in the intensity of the physical stimulus, its frequency, its duration, its intermittent period, its repetition frequency, etc.

As the physical stimulus provided by the haptic feedback device to the driver, vibration is preferred due to readiness of operation control, economical availability of a device therefor. Further, since various kinds of vibrations will be transmitted to the driver in the course of traveling, preferably, the frequency of the vibration provided by the haptic feedback device differs from the frequencies of such other vibrations. For instance, according to one preferred embodiment, the haptic device generates vibration having a frequency different from the natural vibration occurring in the vehicle body in the course of traveling.

In case the haptic feedback device is incorporated in a plurality of vehicle constituent members (a maneuvering operational tool, a driver's seat, a footrest, a maneuvering operational tool, etc.), preferably, in reporting with a high degree of emergency, two or more haptic feedback devices may be employed to provide the physical stimulus to the driver.

DETAILED DESCRIPTION

Next, one embodiment of an open-cabin riding mower relating to the present invention will be explained with reference to the accompanying drawings. Incidentally, in this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 1:
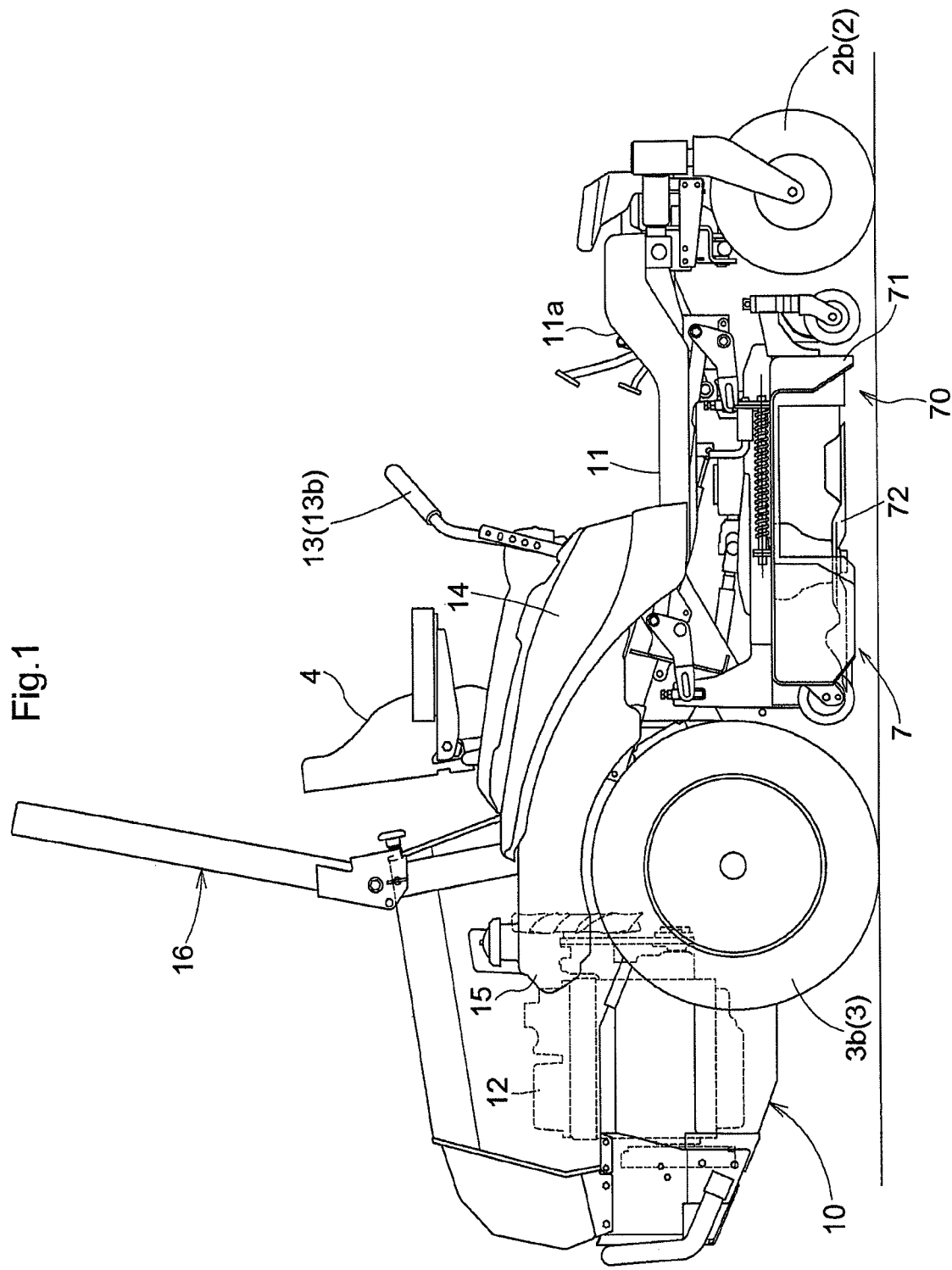
FIG. 1 is a side view of a mower.
Figure 2:
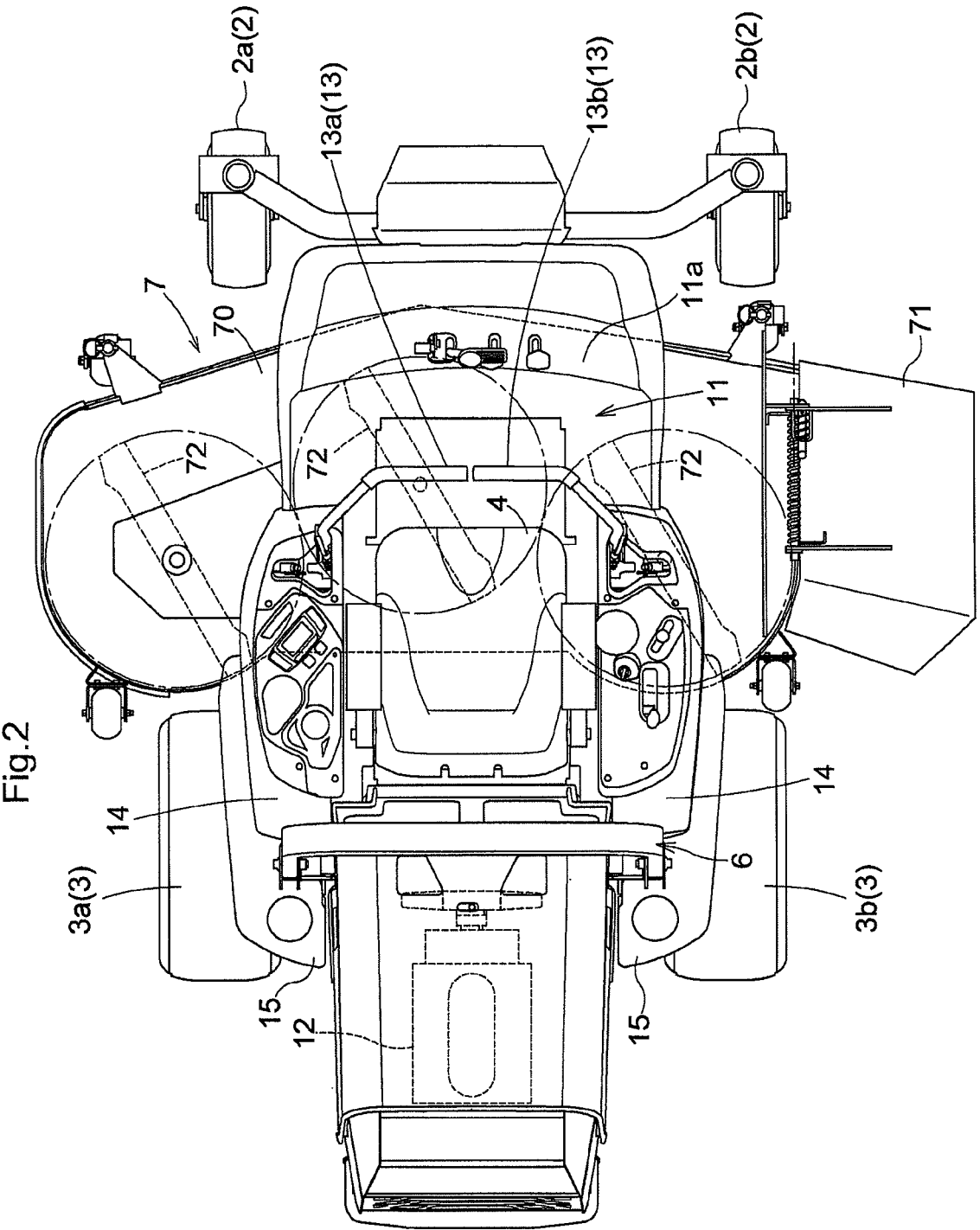
FIG. 2 is a plan view of the mower.

As shown in FIG. 1 and FIG. 2, this mower includes a vehicle body frame 10 which is supported on a ground surface via a front wheel unit 2 as a caster unit and a rear wheel unit 3 as driving wheels. This mower is a so-called zero-turn mower with a left rear wheel 3a and a right rear wheel 3b together constituting the rear wheel unit 3 being independently speed-controlled in the forward and reverse directions. The front wheel unit 2 includes a pair of left and right front wheels 2a, 2b. The vehicle body frame 10 is formed of a pair of left and right longitudinal frames extending in the vehicle body front/rear direction and cross beams extending in the vehicle body transverse direction to interconnect the longitudinal frames and formed of angular pipes or plate members. Between the front wheel unit 2 and the rear wheel unit 3, a mower unit 4 is suspended from the vehicle body frame 10 to be liftable up/down.

At a center portion of the vehicle body frame 10, a driver's seat (to be referred to simply as "seat" hereinafter) 4 is provided. With absence of a cabin (enclosure), the seat 4 is exposed to the outside. On the upper face of the front portion of the vehicle body frame 10, there is laid a floor plate 11 for use as a "footrest" for the driver. An inclined front area of the floor plate 11 is used as a footrest 11a, where foot operational tools are disposed. At the rear portion of the vehicle body frame 10 rearwardly of the seat 4, there are disposed an engine 12 as an internal combustion engine and engine accessories such as a radiator.

A maneuvering unit 13 as one user operable device consists of a left maneuvering lever 13a disposed on the left side of the seat 4 and a right maneuvering lever 13b disposed on the right side of the seat 4. The left maneuvering lever 13a is used for adjusting a rotational speed of the left rear wheel 3a. The right maneuvering lever 13b is used for adjusting a rotational speed of the right rear wheel 3b. And, the left maneuvering lever 13a and the right maneuvering lever 13b are respectively operable over and across a forward traveling speed changing range, a neutral and a reverse traveling speed changing range.

On the left and right opposed sides of the seat 4, there are disposed user operational devices such as various kinds of operational levers and operational buttons, etc. Rearwardly of the seat 4, an arch-shaped ROPS 16 is mounted vertically. Under the fenders 14, a fuel tank 15 is disposed.

The mower unit 7 includes a side-discharge type mower deck 70 and a discharger cover 71 disposed on a grass clipping discharging side of the mower deck 70. In the inner space of the mower deck 70, there are provided three blades 72 that are disposed side by side in the vehicle body transverse direction. The blades 72 are rotated by PTO power from the engine 12.

Power from the engine 12 is transmitted via an unillustrated traveling transmission including a pair of left and right HST's (hydrostatic transmissions) to the left rear wheel 3a and the right rear wheel 3b independently. Speed changing ratios including forward traveling, reverse traveling and the neutral are adjusted based on pivotal operations of the left maneuvering lever 13a and the right maneuvering lever 13b. More particularly, in response to user operations on the left maneuvering lever 13a and the right maneuvering lever 13b, a stopped state, a straight traveling state, a gentle turning state, a pivot turning stage and a spin turning state can be realized respectively. The stopped state is realized by stopping the left rear wheel 3a and the right rear wheel 3b. The straight traveling state is realized by driving the left rear wheel 3a and the right rear wheel 3b at an equal speed forwardly or reversely. The gentle turning state is realized by driving the left rear wheel 3a and the right rear wheel 3b at different speeds forwardly or reversely. The pivot turning state is realized by stopping one of the left rear wheel 3a and the right rear wheel 3b and driving the other forwardly or reversely. The spin turning state is realized by driving one of the left rear wheel 3a and the right rear wheel 3b forwardly and driving the other thereof reversely.

Next, with reference to FIG. 3, there will be explained a basic arrangement of a haptic feedback system mounted on this mower. The haptic feedback system shown in FIG. 3 includes a group of sensors ("sensor group") 9 for detecting various conditions of the mower in the course of grass mowing work, a condition evaluation unit 5 for evaluating a condition(s) relating to traveling of the mower based on signals from the sensor group 9, a haptic feedback device (denoted as "HBD" in short in FIG. 3) 6 for providing a physical stimulus to the driver, and a device control section 5 configured to control an operational mode of the haptic feedback device 6 based on result of evaluation made by the condition evaluation unit 5. The condition evaluation unit 5 is equipped with an operation pattern table 50. In this operation pattern table 50, there are retrievably recorded and stored various kinds of operational patterns. In operation, the condition evaluation unit 5 retrieves from the operational pattern table 50 an operational pattern in accordance with the evaluation result. The condition evaluation unit 5, the operation pattern table 50 and the device control section 60 are built in a mower control unit 100 of the mower.

The sensor group 9 includes sensors for detecting an obstacle, a fuel remaining amount, a power source trouble, a mowing trouble, etc. In this invention, the sensors include also a communication module for detecting communication from the outside. The condition evaluation unit 5 produces various functions in response to signals from the sensor group 9, there will be provided e.g. rear obstacle evaluation function, fuel remaining amount evaluation function, power source trouble evaluation function, mowing trouble evaluation function, external communication evaluation function, etc.

The haptic feedback device 6 comprises an actuator configured to give the driver a physical stimulus such as vibration, pressure, aperiodic movement, etc. This haptic feedback device 6 can, in a simple form, comprise a solenoid, a vibrator, or the like and its operational pattern is controlled by the device control section 60. Some examples of operational patterns to be employed include the intensity of the physical stimulus, the frequency of the physical stimulus, the frequency of the physical stimulus, the duration of the physical stimulus, intermittent period of the physical stimulus, the repetition frequency of the physical stimulus, etc. Incidentally, in case a variable frequency vibrator is employed as the physical stimulus, the frequency of its vibration will be adjusted to be made different from the frequency of vibration (natural frequency of vehicle body) transmitted from the vehicle body to the haptic feedback device 6 incorporated in the vehicle body constituent member.

Figure 3:
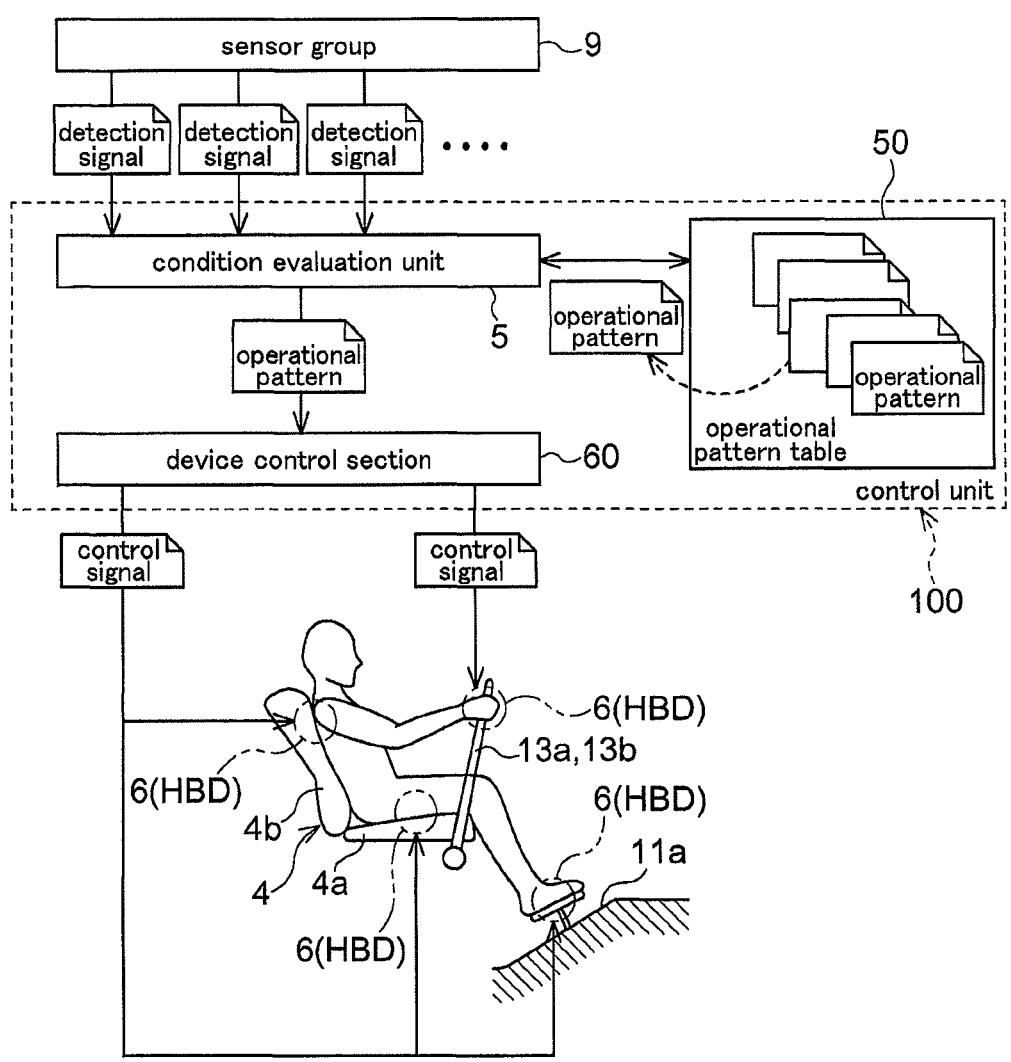
FIG. 3 is a functional block diagram showing a basic arrangement of a haptic feedback system.

In order to give a physical stimulus to the driver, as shown in FIG. 3, the haptic feedback device 6 is incorporated in a vehicle body constituent member to which the driver's body is to be placed in direct contact. In the case of FIG. 3 illustration, such haptic feedback devices 6 are incorporated in the footrest 11*a*, the left maneuvering lever 13*a*, the right maneuvering lever 13*b*, the seat cushion 4*a*, and the seat back 4*b*, respectively.

Next, the flow of control effected in the haptic feedback system configured as described above will be explained. Detection signals are transmitted to the condition evaluation unit 5 from the sensor group 9. Then, the condition evaluation unit 5 evaluates various conditions of the mower based on these acquired detection signals. If an evaluation result to be alerted to the driver issues, then, the degree of emergency to be alerted to the driver is calculated from this evaluation result. Based on the mower condition used in the evaluation and its emergency degree, an appropriate operational pattern will be retrieved from the preset operational pattern table 50. When transmitting the retrieved operational pattern to the device control section 60, the condition evaluation unit 5 designates one or more haptic feedback device(s) 6 to be activated and attaches its (their) designation(s) to the operational pattern. With this, the device control section 60 will operate the designated haptic feedback device(s) 6 according to the appropriate operational pattern (which defines intensity, duration period, repetition times, repetition frequency, etc.).

Figure 4:
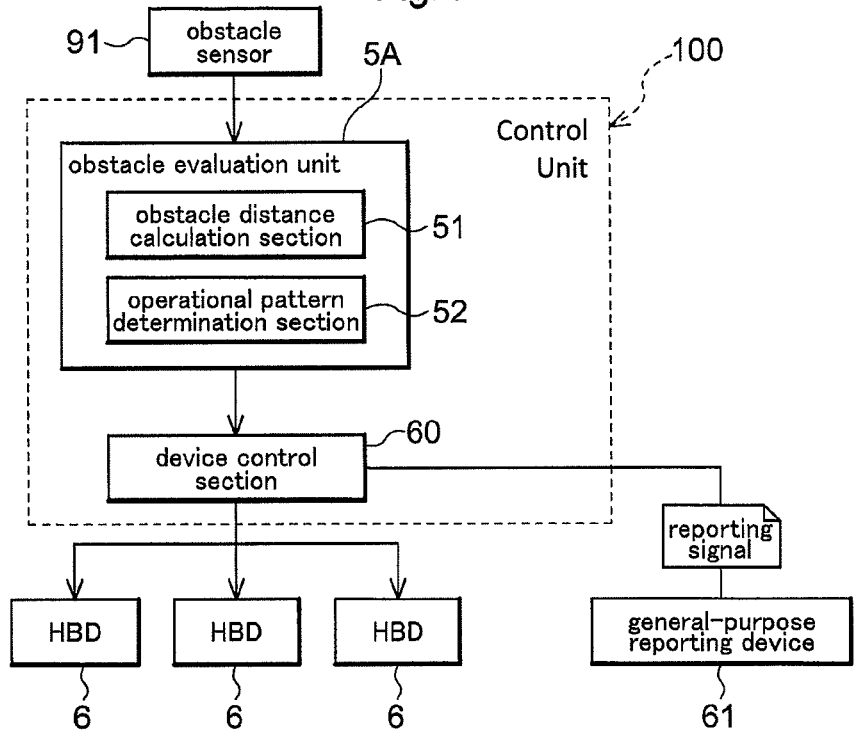
FIG. 4 is a functional block diagram of an obstacle monitoring system.

Next, as a specific embodiment of the haptic feedback system, there will be explained an obstacle monitoring system for making the driver take notice of an obstacle present rearwardly of the mower. FIG. 4 shows a functional diagram of this obstacle monitoring system and FIG. 5 shows a monitoring area of an obstacle to be monitored by this obstacle monitoring system.

In this obstacle monitoring system, there is employed an obstacle sensor 91 comprised of an ultrasonic sensor, a laser radar, or the like. The condition evaluation unit 5 is configured as an obstacle evaluation unit 5A. The obstacle evaluation unit 5A includes an obstacle distance calculation section 51, an operational pattern determination section 52 and the device control section 60.

The obstacle distance calculation section 51 calculates the distance ("obstacle distance") from the mower vehicle body to an obstacle, based on a detection signal from the obstacle sensor 91.

Figure 5:
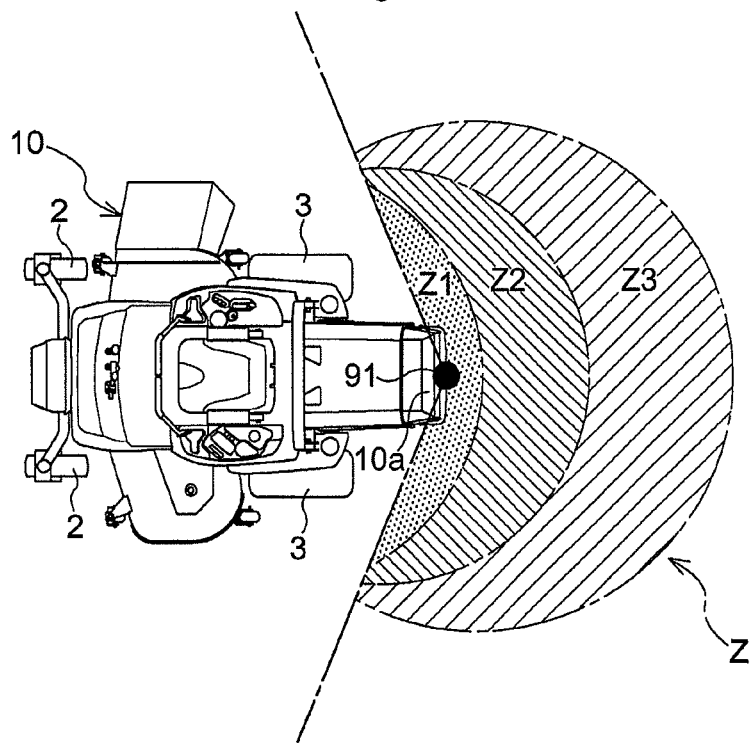
FIG. 5 shows a monitoring area for an obstacle monitored by the obstacle monitoring system.

As shown in FIG. 5, in the peripheral area of the vehicle body 10 rear portion, an obstacle caution area Z is set. In the example shown in FIG. 5, the obstacle caution area Z is divided into a first caution area Z1, a second caution area Z2, and a third caution area Z3. The first caution area Z1 has the highest degree of caution and the third caution area Z3 has the lowest degree of caution. The second caution area Z2 has a caution degree therebetween. Incidentally, such obstacle caution area Z may be set on the lateral side(s) or the forward side of the vehicle body 10.

The operational pattern determination section 52 determines an operational pattern, in accordance with the caution area Z1 or Z2 or Z3 in which the detected obstacle is present and sends the determined pattern to the device control section 60. With this, if an obstacle is detected in the third caution area Z3 for instance, relatively weak vibration will be given only for a short period to the driver via one haptic feedback device 6. If an obstacle is detected in the second caution area Z2, stronger vibration will be given for a longer period (e.g. until exit into the third caution area Z3) via one or more haptic feedback devices 6. If an obstacle is detected in the first caution area Z1, then, strongest vibration will be given to the driver via all of the haptic feedback devices 6 until the obstacle moves out of the first caution area Z1 or the mower makes a stop.

Needless to say, the mower includes a standard general-purpose reporting device 61 also. Therefore, the obstacle evaluation unit 5A sends obstacle detection information including the obstacle distance to the device control section 60. Then, based on this obstacle detection information, the device control section 60 transmits a control signal to the general-purpose reporting device 61 to report the presence of obstacle to the driver. For instance, in case the general-purpose reporting device 61 is provided as an LED, an LED selected in accordance with such caution area as one shown in FIG. 5 will be lit. Or, in case the general-purpose reporting device 61 is provided as a display capable of graphic displaying, the area of the presence of the obstacle can be reported via color distinction. Further, in case the general-purpose reporting device 61 is provided as a buzzer or a speaker, the presence of the obstacle will be reported as an alarming sound or an alarming voice.

Reporting by the general-purpose reporting device 61 relying on visual or auditory perception can often fail to be noticed by the driver due to traveling noise and/or traveling vibration of the mower. Therefore, upon occurrence of an emergency situation, firstly the haptic feedback device(s) 6 will be activated, whereby the driver will be made aware of occurrence of some traveling condition to be alerted. As a result, the driver's attention can be positively directed to the general-purpose reporting device 61.

In the specific example described above, monitoring of an obstacle was described. However, in the case of other alarming conditions of the mower too, via the activation of the haptic feedback device(s) 6, it is possible to direct the driver's attention to the general-purpose reporting device 61.

Some examples of such other alarming conditions to be reported to the driver via the haptic feedback device 6 and the general-purpose reporting device 61 include a fuel remaining amount, an engine overload, an engine oil pressure drop, grass clippings clogging, and so on. Moreover, if a mobile phone carried by the driver and the control unit 100 are operably linked to each other, it becomes possible to activate the haptic feedback device(s) 6 in response to a call signal to such mobile phone.

Figure 6:
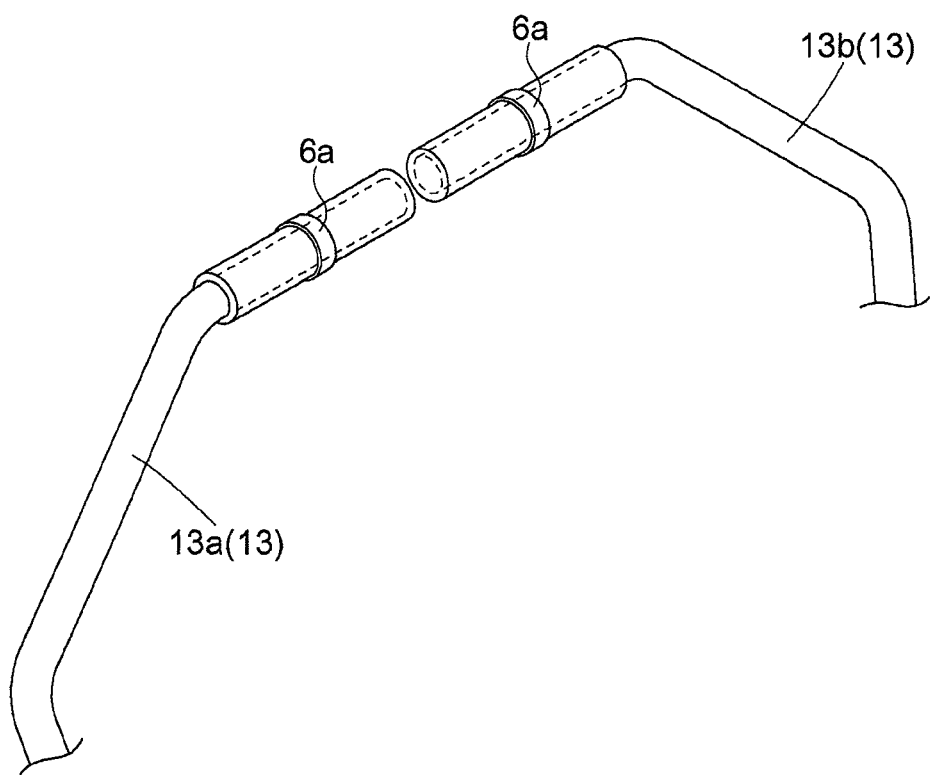
FIG. 6 is a perspective view showing a haptic feedback device incorporated in a maneuvering lever.

It is essential that the haptic feedback device 6 be incorporated in a constituent member which is substantially constantly in contact with the body of the driver engaged in driving. As a preferred example, as shown in FIG. 6, vibrators 6a as the haptic feedback device 6 can be incorporated in grip portions of the left maneuvering lever 13a and the right maneuvering lever 13b. In such case, simple wiring layout of signal lines connecting between the vibrators 6a and the control unit 100 (or the device control section 60) will be difficult. This difficulty can be solved by connecting the vibrators 6a with the control unit 100 via wireless communication. Preferably, transmission of control signals from the control unit 100 to other haptic feedback devices 6 too is effected via wireless communication.

In the foregoing embodiment, a mower, in particular, a zero-turn mower was used as a work vehicle. Needless to say, the inventive work vehicle can be any other type of mower, an agricultural work vehicle such as a tractor or even a civil engineering work vehicle, etc., advantageously.

In the meantime, the arrangements disclosed in the foregoing embodiment (including the further embodiment) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. An open-cabin riding mower comprising:
   a driver's seat that contacts the body of a driver in the course of traveling;
   a footrest for receiving a foot of the driver;
   a maneuvering operational tool to be gripped by the driver in the course of traveling;
   a haptic feedback device incorporated in at least one of the driver's seat, the footrest and the maneuvering operational tool and configured to provide a physical stimulus to the driver;
   a condition evaluation unit evaluating a condition related to traveling of the mower; and
   a device control section controlling an operational pattern of the haptic feedback device based on a result of an evaluation by the condition evaluation unit,
   wherein the operational pattern is retrieved from an operational pattern table in response to the evaluation of the condition evaluation unit, and
   wherein the condition evaluation unit calculates a distance to an obstacle based on a signal from an obstacle sensor as an obstacle distance and the device control section selects an operational pattern having a number of actuated open-cabin riding mower haptic feedback devices which progressively increases in accordance with decrease in the obstacle distance.

2. The mower of claim 1, wherein the condition evaluation unit includes at least one of rear obstacle evaluation function, fuel remaining amount evaluation function, power source trouble evaluation function, mowing trouble evaluation function and external communication evaluation function.

3. The mower of claim 1, wherein the operational pattern creates a change in at least one of intensity of the physical stimulus, frequency of the physical stimulus, duration of the physical stimulus, intermittent period of the physical stimulus, and repetition frequency of the physical stimulus.

4. The mower of claim 1, wherein the physical stimulus comprises vibration having a selected frequency given to the driver which is different from a vehicle body natural frequency at the time of operation of the haptic feedback device.

5. The mower of claim 2, wherein:
   the device control section selects an operational pattern having an intensity which progressively increases in accordance with decrease in the obstacle distance.

6. The mower of claim 2, wherein when an obstacle distance falls below a predetermined distance, two or more haptic feedback devices provide the physical stimulus to the driver.

7. The mower of claim 1, wherein the device control section controls an operation of the haptic feedback device via wireless communication.

8. The mower of claim 1, further comprising:
   a wearable haptic feedback device controlled by wireless communication from the device control section.

9. The mower of claim 8, wherein the wearable haptic feedback device comprises a mobile phone with a vibrator.

10. The mower of claim 1, wherein:
    the device control section selects an operational pattern having an intensity which corresponds to one of a plurality of obstacle caution zones.

11. The mower of claim 10, wherein at least one obstacle zone corresponds to at least one of a lateral side, a front side and a rear side of the mower.

* * * * *